US011441945B2

(12) United States Patent
Eilertsen et al.

(10) Patent No.: US 11,441,945 B2
(45) Date of Patent: Sep. 13, 2022

(54) DISTANCE MEASUREMENTS USING SPECTROMETER SYSTEMS

(71) Applicant: ams Sensors Singapore Pte. Ltd., Singapore (SG)

(72) Inventors: James Eilertsen, Zurich (CH); Javier Miguel Sánchez, Zurich (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/290,066

(22) PCT Filed: Nov. 13, 2019

(86) PCT No.: PCT/SG2019/050557
§ 371 (c)(1),
(2) Date: Apr. 29, 2021

(87) PCT Pub. No.: WO2020/101574
PCT Pub. Date: May 22, 2020

(65) Prior Publication Data
US 2021/0396577 A1 Dec. 23, 2021

Related U.S. Application Data

(60) Provisional application No. 62/767,846, filed on Nov. 15, 2018.

(51) Int. Cl.
*G01J 3/28* (2006.01)
*G01J 3/02* (2006.01)
*G01J 3/36* (2006.01)

(52) U.S. Cl.
CPC .......... *G01J 3/0278* (2013.01); *G01J 3/0272* (2013.01); *G01J 3/0275* (2013.01); *G01J 3/0289* (2013.01);
(Continued)

(58) Field of Classification Search
CPC combination set(s) only.
See application file for complete search history.

(56) References Cited

U.S. PATENT DOCUMENTS 9,791,569 B2 * 10/2017 Hughes .................. G01S 17/42

FOREIGN PATENT DOCUMENTS

DE 102016216842 A1 3/2018
EP 1694048 A1 8/2006

OTHER PUBLICATIONS

International Search Report and Written Opinion for Application No. PCT/SG2019/050557 dated Feb. 24, 2020 (11 pages).

(Continued)

*Primary Examiner* — Abdullahi Nur
(74) *Attorney, Agent, or Firm* — Viering, Jentschura & Partner mbB

(57) ABSTRACT

An example system includes a light source, a first spectrometer, a second spectrometer, and an electronic control module. The light source is operable to emit light within a first range of wavelengths in a field of illumination. The first spectrometer is operable to measure first sample light reflected from an object within a second range of wavelengths and in a first field of detection. The second spectrometer is operable to measure second sample light reflected from the object within a third range of wavelengths and in a second field of detection. The electronic control module operable to determine, based on the measured first sample light and the measured second sample light, a distance between the system and the object, and determine, based on the measured first sample light and the measured second sample light, a spectral distribution of light corresponding to the object.

20 Claims, 6 Drawing Sheets

(52) U.S. Cl.
CPC ........... *G01J 3/0294* (2013.01); *G01J 3/2803* (2013.01); *G01J 3/36* (2013.01)

(56) References Cited

OTHER PUBLICATIONS

International Preliminary Report on Patentability for Application No. PCT/SG2019/050557 dated May 18, 2021 (7 pages).

* cited by examiner

DISTANCE MEASUREMENTS USING SPECTROMETER SYSTEMS

TECHNICAL FIELD

The disclosure relates to spectrometers.

BACKGROUND

A spectrometer is an instrument used to measure a light spectrum of sample light (e.g., to determine the spectral components of ultraviolet, visible, and/or infrared light). In some cases, spectrometers can determine the intensity of light as a function of wavelength or of frequency.

Spectrometers can be used for a variety of different applications. For example, spectrometers can be used to conduct environmental analyses, industrial monitoring, color measurements, and pharmacological studies.

A light spectrum can be measured in different ways, such as through direct measurement or indirect measurement. As an example, a spectrometer configured for direct measurement can separate different wavelengths of light spatially (e.g., using wavelength dispersive devices, such as diffractive gratings or prisms), and measure the power distribution of each wavelength of light individually (e.g., to "directly" measure the spectrum with respect to specific wavelengths).

As another example, a spectrometer configured for indirect measurement can modulate light according to a series of known spectral modulation patterns, and obtain measurements of the modulated light. Each measurement provides information carried by multiple wavelengths and according to different weights, and can be used to reconstruct the spectrum of the original light (e.g., using a multiplexing technique).

SUMMARY

A spectrometer system can be used to determine information regarding a sample (e.g., an object) based on the properties of light reflected from the sample. As an example, a spectrometer system can emit light (e.g., light having known spectral properties) toward the sample, and measure light reflected from the sample and returning to the spectrometer system. The spectrometer system can determine the spectral properties of the reflected light (e.g., the distribution of light with respect to a range of wavelengths), and determine information regarding the sample based on these measurements. As an example, the spectrometer system can determine the physical shape or profile of the sample, the characteristics of the surface of the sample, and/or the composition of the sample.

However, in some cases, the spectral properties of the reflected light may vary depending on the distance between the spectrometer system and the sample. As an example, if a sample is positioned relatively close to the spectrometer system, the reflected light measured by the spectrometer system may exhibit certain spectral properties due to the proximity between the spectrometer system and the sample. However, if the same sample is moved further away from the spectrometer system, the reflected light measured by the spectrometer system may exhibit different spectral properties due to the increased separation between the spectrometer system and the sample, and the difference in light paths between them. Due to this variation, a spectrometer system may exhibit lower accuracy and/or precision when determining the characteristics of a sample To enhance the performance of the spectrometer system, the spectrometer system can measure both the spectral distribution of light reflected from a sample, and the distance between the sample and the spectrometer system at the time of the measurement. This technique can be useful, for instance, as it enables different measurements to be compared to each other in a more meaning way. Further, this technique enables measurements to be interpreted relative to one another in a more consistent manner. For example, if two spectral distribution measurements are obtained according to a similar distance between the samples and the spectrometer systems, differences between the spectral distribution measurements are more likely to reflect differences between the samples themselves (e.g., differences in shapes, profiles, surface characteristics, composition, etc.). As another example, if two spectral distribution measurements are obtained according to different distances between the samples and the spectrometer systems, at least some of the differences between the spectral distribution measurements may reflect differences between the distances rather than differences between the samples themselves.

In some cases, measurements obtained by one or more spectrometer systems can be shared with one or more other spectrometer systems or other systems to facilitate analysis of samples. For example, a spectrometer system can measure both the spectral distribution of light reflected from a sample and the distance between the sample and the spectrometer system at the time of the measurement, and transmit the measurements to a remote server system. Further, the spectrometer system can transmit additional information regarding the sample (e.g., known or estimated shapes, profiles, surface characteristics, and/or compositions of the sample). Other spectrometer system can retrieve the measurements and the additional information regarding the sample, and determine the characteristics of a sample based on the retrieved information. This is beneficial, for example, as it enables a spectrometer system to leverage measurements and other collected information from one or more other spectrometer systems to make more accurate determinations regarding a sample.

In an aspect, a system includes a light source, a first spectrometer, a second spectrometer, and an electronic control module. The light source is operable to emit light within a first range of wavelengths in a field of illumination. The first spectrometer is operable to measure first sample light reflected from an object within a second range of wavelengths and in a first field of detection. The second range of wavelengths is a subset of the first range of wavelengths. The second spectrometer is operable to measure second sample light reflected from the object within a third range of wavelengths and in a second field of detection. The third range of wavelengths is a subset of the first range of wavelengths. The third range of wavelengths at least partially overlaps the second range of wavelengths. The second field of detection is different from the first field of detection. The electronic control module operable to determine, based on the measured first sample light and the measured second sample light, a distance between the system and the object, and determine, based on the measured first sample light and the measured second sample light, a spectral distribution of light corresponding to the object.

Implementations of this aspect can include one or more of the following features.

In some implementations, the first spectrometer can be operable to measure the first sample light concurrently with the second spectrometer measuring the second sample light.

In some implementations, the first spectrometer can be operable to measure the first sample light incrementally with respect to the second range of wavelengths. The second spectrometer can be operable to measure the second sample light incrementally with respect to the third range of wavelengths.

In some implementations, the second spectrometer can be disposed between the first spectrometer and the light source along an axis of the system.

In some implementations, the first field of detection can partially overlap the second field of detection.

In some implementations, the field of illumination can at least partially overlap the first field of detection and the second field of detection.

In some implementations, the electronic control module can be operable to determine the distance by determining a first intensity value indicating an intensity of the first sample light with respect to a fourth range of wavelengths, the fourth range of wavelengths being common to the second range of wavelengths and the third range of wavelengths, and determining a second intensity value indicating an intensity of the second sample light with respect to the fourth range of wavelengths.

In some implementations, the electronic control module can be operable to generate a data record indicating the spectral distribution of light and the distance.

In some implementations, the electronic control module can be operable to transmit the data record to a remote computer system.

In some implementations, the electronic control module can be operable to retrieve, from the remote computer system, one or more additional data records, each additional data record indicating a respective sample spectral distribution of light and a respective sample distance associated with that sample spectral distribution of light. Further, the electronic control module can be operable to determine at least one of a similarity between the distance and one or more sample distances, or a similarity between the spectral distribution of light and one or more sample spectral distributions of light.

In some implementations, the electronic control module can be operable determine a composition of the object based on at least one of the similarity between the distance and one or more sample distances, or the similarity between the spectral distribution of light and one or more sample spectral distributions of light.

In some implementations, the electronic control module can be operable to determine a reflectivity of the object, and determine the spectral distribution of light corresponding to the object based further on the reflectivity of the object.

In some implementations, the reflectivity of the object can be determined based on at least one of a power of the first sample light or a power of the second sample light.

In some implementations, determining the spectral distribution of light can include calibrating at least one of the first spectrometer or the second spectrometer based on the reflectivity of the object.

In some implementations, the system can be a mobile device.

In another aspect, a method can be performed to determine a spectral distribution of light. According to the method, light is emitted within a first range of wavelengths in a field of illumination using a light source of a system. First sample light reflected from an object is measured within a second range of wavelengths and in a first field of detection using a first spectrometer of the system. The second range of wavelengths is a subset of the first range of wavelengths. Second sample light reflected from the object is measured using a second spectrometer of the system within a third range of wavelengths and in a second field of detection. The third range of wavelengths is a subset of the first range of wavelengths. The third range of wavelengths at least partially overlaps the second range of wavelengths. The second field of detection is different from the first field of detection. A distance between the system and the object is determined using an electronic control module based on the measured first sample light and the measured second sample light. A spectral distribution of light corresponding to the object is determined using the electronic control module based on the measured first sample light and the measured second sample light.

Implementations of this aspect can include one or more of the following features.

In some implementations, the first sample light and the second sample light can be measured concurrently.

In some implementations, the first sample light can be measured incrementally with respect to the second range of wavelengths. The second sample light can be measured incrementally with respect to the third range of wavelengths.

In some implementations, the first field of detection can partially overlap the second field of detection.

In some implementations, The field of illumination can at least partially overlap the first field of detection and the second field of detection.

In some implementations, determining the distance between the system and the object can include determining a first intensity value indicating an intensity of the first sample light with respect to a fourth range of wavelengths, the fourth range of wavelengths being common to the second range of wavelengths and the third range of wavelengths, and determining a second intensity value indicating an intensity of the second sample light with respect to the fourth range of wavelengths.

In some implementations, the method can include generating a data record indicating the spectral distribution of light and the distance.

In some implementations, the method can include transmitting the data record to a remote computer system.

In some implementations, the method can include retrieving, from the remote computer system, one or more additional data records, each additional data record indicating a respective sample spectral distribution of light and a respective sample distance associated with that sample spectral distribution of light. The method can also include determining at least one of a similarity between the distance and one or more sample distances, or a similarity between the spectral distribution of light and one or more sample spectral distributions of light.

In some implementations, the method can include determining a composition of the object based on at least one of the similarity between the distance and one or more sample distances, or the similarity between the spectral distribution of light and one or more sample spectral distributions of light.

In some implementations, the method can include determining a reflectivity of the object, and determining the spectral distribution of light corresponding to the object based further on the reflectivity of the object.

In some implementations, the reflectivity of the object can be determined based on at least one of a power of the first sample light or a power of the second sample light.

In some implementations, determining the spectral distribution of light can include calibrating at least one of the first spectrometer or the second spectrometer based on the reflectivity of the object.

The details of one or more implementations are set forth in the accompanying drawings and the description below. Other features and advantages will be apparent from the description and drawings, and from the claims.

DETAILED DESCRIPTION

This disclosure describes implementations of a spectrometer system for measuring both the spectral distribution of light reflected from a sample, and the distance between the sample and the spectrometer system at the time of the measurement. Implementations of the spectrometer system can be used, for example, to obtain information regarding a sample more accurately and/or precisely, despite variations in the distance between the sample and spectrometer system from one measurement to another.

Figure 1:
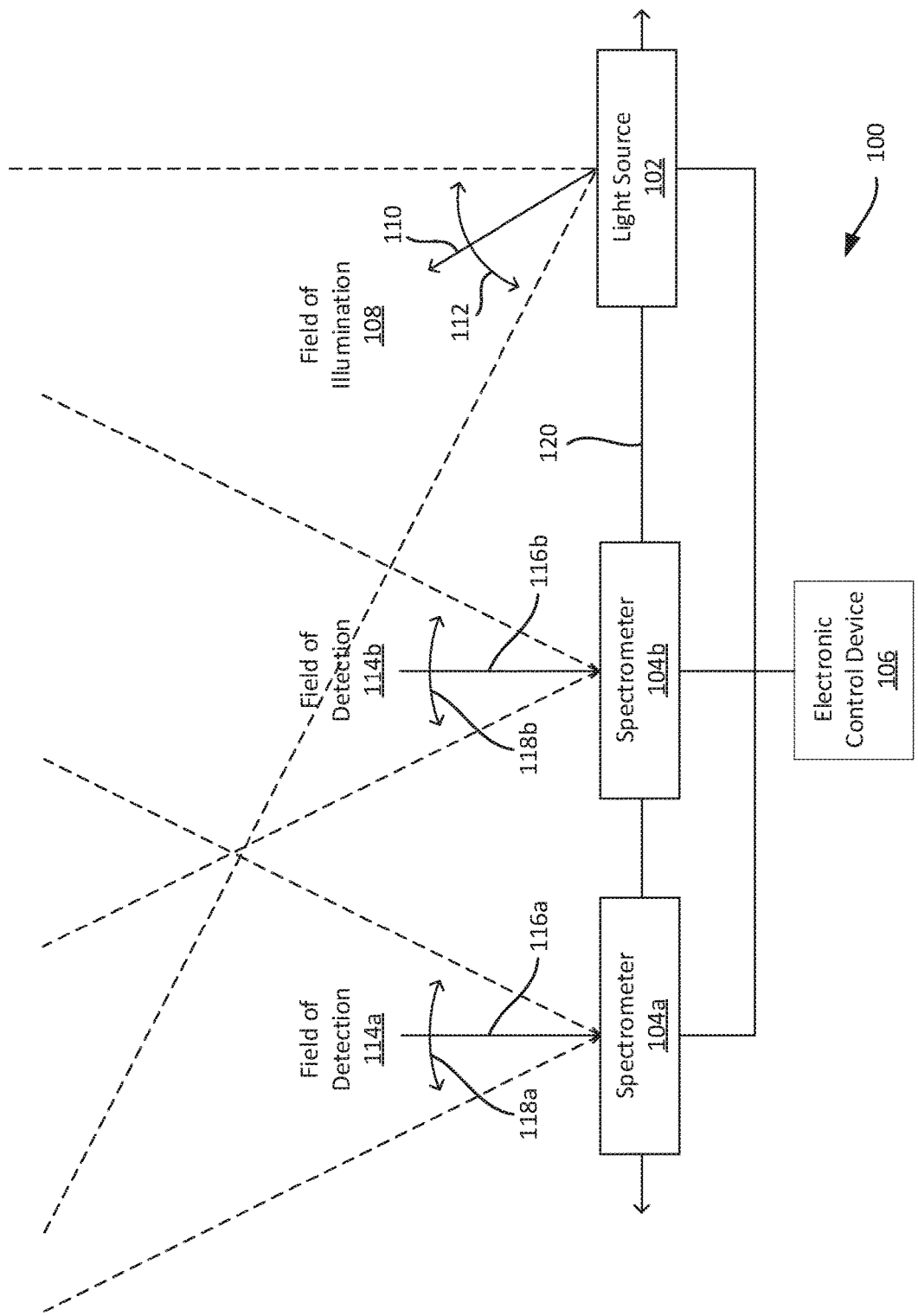
FIG. 1 is a schematic diagram of an example spectrometer system.

FIG. 1 shows an example spectrometer system 100. The spectrometer system 100 can be implemented as a stand-alone device (e.g., as an individual instrument), or as part of another device (e.g., as a part of a multi-purpose device). In some cases, the spectrometer system 100 can be implemented as a part of a mobile device, such as a smart phone, a tablet computer, or a wearable computer. As shown in FIG. 1, an example spectrometer system 100 includes a light source 102, a first spectrometer 104a, a second spectrometer 104b, and an electronic control device 106. In an example usage of the spectrometer system 100, the light source 102 generates light, which is emitted toward a sample (e.g., an object in proximity to the spectrometer system 100). The spectrometers 104a and 104b measures the spectral distribution of light that reflects from the sample and returns to the spectrometer system 100. The electronic control device 106 determines information regarding the sample (e.g., the distance between the sample and the spectrometer system 100, and characteristics of the sample) based on the measurements.

The light source 102 is a component operable to generate light and emit the light toward a sample according to a field of illumination 108. As shown in FIG. 1, the field of illumination 108 can be defined by a particular light propagation axis 110 and angular range 112 of light emission by the light source 102. The light source 102 can include one or more light emitting elements. As an example, the light source 102 can include one or more light emitting diodes (LEDs), vertical cavity surface emitting lasers (VCSELs), organic light emitting diodes (OLEDs), or other devices that selectively generate light. In some cases, the light source 102 can emit light within a first range of wavelengths $\lambda_1$ to $\lambda_6$, where $\lambda_1 < \lambda_6$.

In some cases, the spectrometers 104a and 104b measure light reflecting from the sample and returning to the spectrometer system 100 (e.g., reflected light incident on the spectrometers 104a and 104b, respectively). The spectrometers 104a and 104b can measure various characteristics of the reflected light using one or more photodetectors. As an example, each spectrometer 104a or 104b can measure the intensity of the reflected light and/or the spectral characteristics of the reflected light. In some cases, the spectrometers 104a and 104b can be operable to measure light according to one or more discrete points in time. In some cases, the spectrometers 104a and 104b can operable to measure light continuously, periodically, intermittently, or according to some other pattern.

The spectrometers 104a and 104b measure reflected light according to different fields of detection. For example, the first spectrometer 104a can measure reflected light according to a first field of detection 114a, and the second spectrometer 104b can measure reflected light according to a different second field of detection 114b overlapping the first field of detection 114a. As shown in FIG. 1, the first field of detection 114a can be defined by a particular light propagation axis 116a and angular range 118a of reflected light and the second field of detection 114b can be defined by a particular light propagation axis 116b and angular range 118b of reflected light. In some cases, the light propagation axis 116a can different from the light propagation axis 116b and/or the angular range 118a can different from the angular range 118b.

In some cases, the spectrometers 104a and 104b can measure reflected light according to different overlapping subsets of the first range of wavelengths of light emitted by the light source 102. For example, the spectrometer 104a may measure light within a first subset of wavelengths $\lambda_2$ to $\lambda_4$, whereas the spectrometer 104b may measure light within a second subset of wavelengths $\lambda_3$ to $\lambda_5$, where $\lambda_1 \leq \lambda_2 < \lambda_3 < \lambda_4 < \lambda_5 \leq \lambda_6$.

The spectrometers 104a and 104b are positioned at different locations. For example, as shown in FIG. 1, the second spectrometer 104b can be positioned between the first spectrometer 104a and the light source 102 along an axis 120 of the spectrometer system 100. In some cases, the first spectrometer 104a can be positioned between the second spectrometer 104b and the light source 102 along the axis 120. Although an example configuration is shown in FIG. 1, in practice, other configurations are also possible.

The electronic control device 106 controls the operation of the light source 102. For example, the electronic control device 106 can be communicatively coupled to the light source 102, and can selectively turn on or off the light source 102 (e.g., to generate light during selected periods of time, such as during a measurement operation). As another example, the electronic control device 106 can specify the characteristics of the generated light (e.g., to generate light according to a specific pattern, spectral composition, etc.). Further, the electronic control device 106 can obtain information describing the characteristics of the emitted light (e.g., the time at which the light is emitted, the intensity of the emitted light, the spectral composition of the emitted light, the phase of the emitted light, etc.).

The electronic control device 106 also controls the operation of the spectrometers 104a and 104b. For example, the electronic control device 106 can be communicatively coupled to the spectrometers 104a and 104b, and selectively turn on or off the spectrometers 104a and 104b (e.g., to measure light during selected periods of time, such as during a measurement operation). Further, the electronic control device 106 can obtain information describing the characteristics of the measured light (e.g., the time at which the light is measured, the intensity of the measured light, the spectral composition of the measured light, the phase of the measured light, etc.).

The electronic control device 106 can determine information regarding the sample (e.g., the distance between the sample and the spectrometer system 100, and characteristics of the sample) based on information regarding the emitted light and the returning light. For example, the electronic control device 106 can determine the distance between the sample and the spectrometer system 100 based on measurements obtained by the spectrometer 104a and 104b. As the spectrometers 104a and 104b are positioned at different locations along the axis 120, light emitted by the light source 102 is reflected asymmetrically onto the spectrometers 104a and 104b. Further, the spectrometers 104a and 104b obtain measurements according to different fields of detection 114a and 114b and different wavelengths of lengths. Accordingly, the measurements obtained by the spectrometers 104a and 104b will differ, depending on the distance between the sample and the spectrometer system 100. The electronic control device 106 can estimate the distance based on these differences, and can associate the estimated distance with the measured spectral distribution of the reflected light. This technique enables light spectrum measurements to be compared to other light spectrum measurements (e.g., light spectrum measurements obtained at the same of different distances) in a more meaningful way. Further, this technique enables light spectrum measurements to be interpreted relative to one another in a more consistent manner.

Figure 2A:
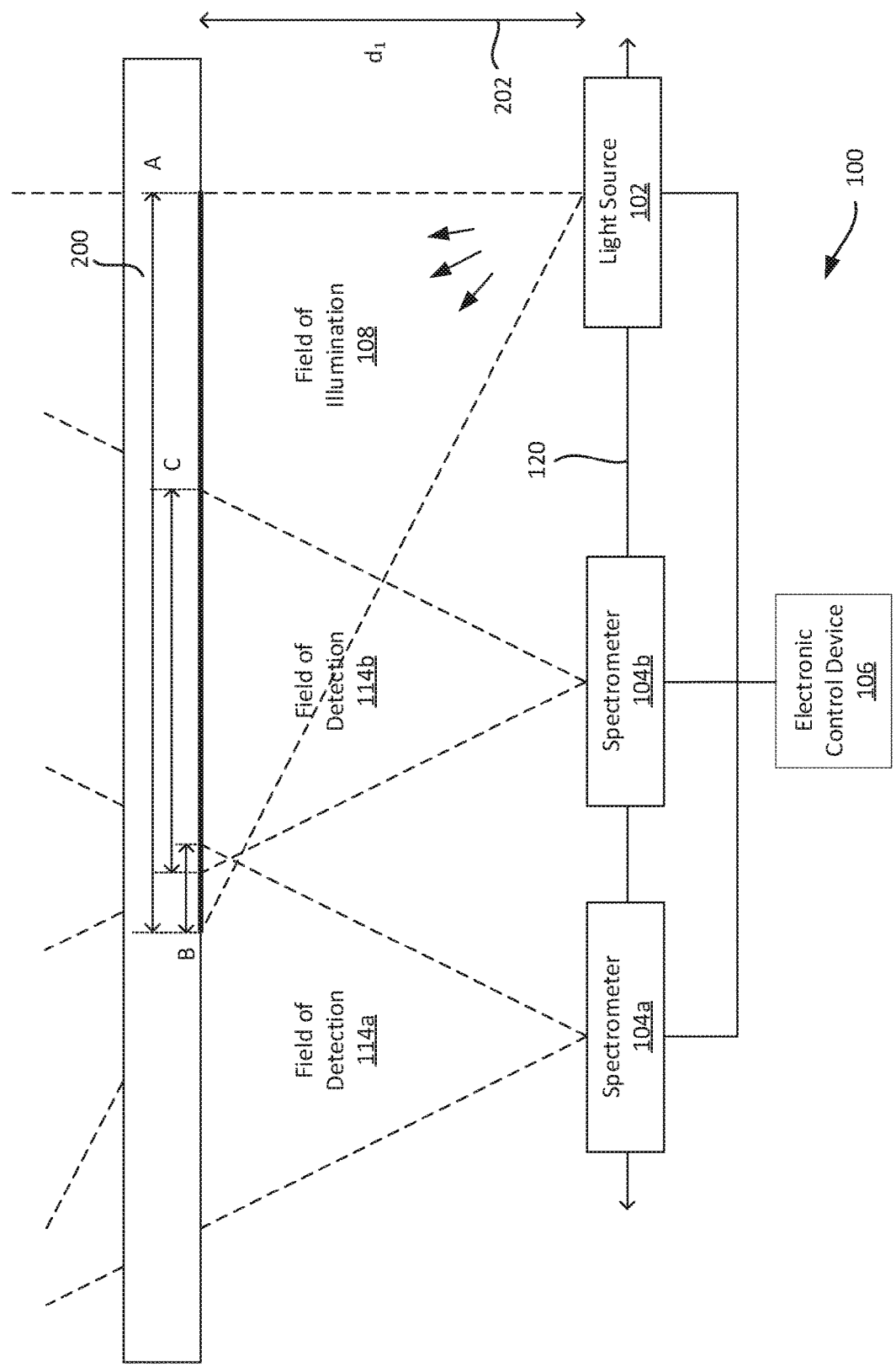
FIG. 2A is a schematic diagram of an example spectrometer system and a sample position a first distance from the spectrometer system.

To illustrate, FIG. 2A, shows an example usage of the spectrometer system 100. In this example, a sample 200 (e.g., an object or other subject to be analyzed by the spectrometer system 100) is positioned at a first distance $d_1$ from the spectrometer system 100. The distance between the sample 200 and the spectrometer system 100 can refer, for example, to the distance between (i) one or more of the light source 102, first spectrometer 104a, and/or the second spectrometer 104b, and (ii) the sample 200. In some cases, the distance can be measured along an axis 202 perpendicular to the axis 120 of the spectrometer system 100.

As shown in FIG. 2A, the light source 102 is operable to generate light and emit the light toward a sample according to a field of illumination 108. The light emitted by the light source 102 illuminates a portion A of the sample 200 in the field of illumination 108. Further, as described above, the light source 102 can emit light within a first range of wavelengths $\lambda_1$ to $\lambda_6$, where $\lambda_1 < \lambda_6$.

The first spectrometer 104a measures light reflecting from the sample 200 according to a first field of detection 114a. For example, the first spectrometer 104a measures reflected light from a portion B of the sample 200 (e.g., the subset of the illuminated portion A within the first field of detection 114a). For instance, the first spectrometer 104a can measure the intensity of the reflected light and/or the spectral characteristics of the reflected light. Similarly, the second spectrometer 104b measures light reflecting from the sample 200 according to a second field of detection 114b that differs from the first field of detection 114a. For example, the second spectrometer 104b measures reflected light from a portion C of the sample 200 (e.g., the subset of the illuminated portion A within the first field of detection 114b). For instance, the second spectrometer 104b can measure the intensity of the reflected light and/or the spectral characteristics of the reflected light.

Further, as described above, the spectrometers 104a and 104b can measure different overlapping subsets of the range of wavelengths of light emitted by the light source 102. For instance, the first spectrometer 104a may measure light within a first subset of wavelengths $\lambda_2$ to $\lambda_4$, whereas the spectrometer 104b may measure light within a second subset of wavelengths $\lambda_3$ to $\lambda_5$, where $\lambda_1 \leq \lambda_2 < \lambda_3 < \lambda_4 < \lambda_5 \leq \lambda_6$. As an example, the first spectrometer 104a can measure light within a first subset of wavelengths 800 nm to 1000 nm, the second spectrometer 104b can measure light within a second subset of wavelengths 800 nm to 1400 nm, with an overlapping range of wavelengths 800 nm to 1000 nm.

Due to the asymmetry of the spectrometer system 100, the dimensions of the portions A, B, and C will vary, depending on the distance between the sample 200 and the spectrometer system 100. Accordingly, the spectrometers 104a and 104b will each detect different amounts of reflected light, depending on the distance. Further, the dimensions of each of portions A, B, and C will exhibit different degrees of change due to changes in distance, depending on the arrangement of the light source 102, the first spectrometer 104a and the second spectrometer 104b, and depending on their respective field of illumination 108, the field of detection 114a, and the field of detection 114b.

Figure 2B:
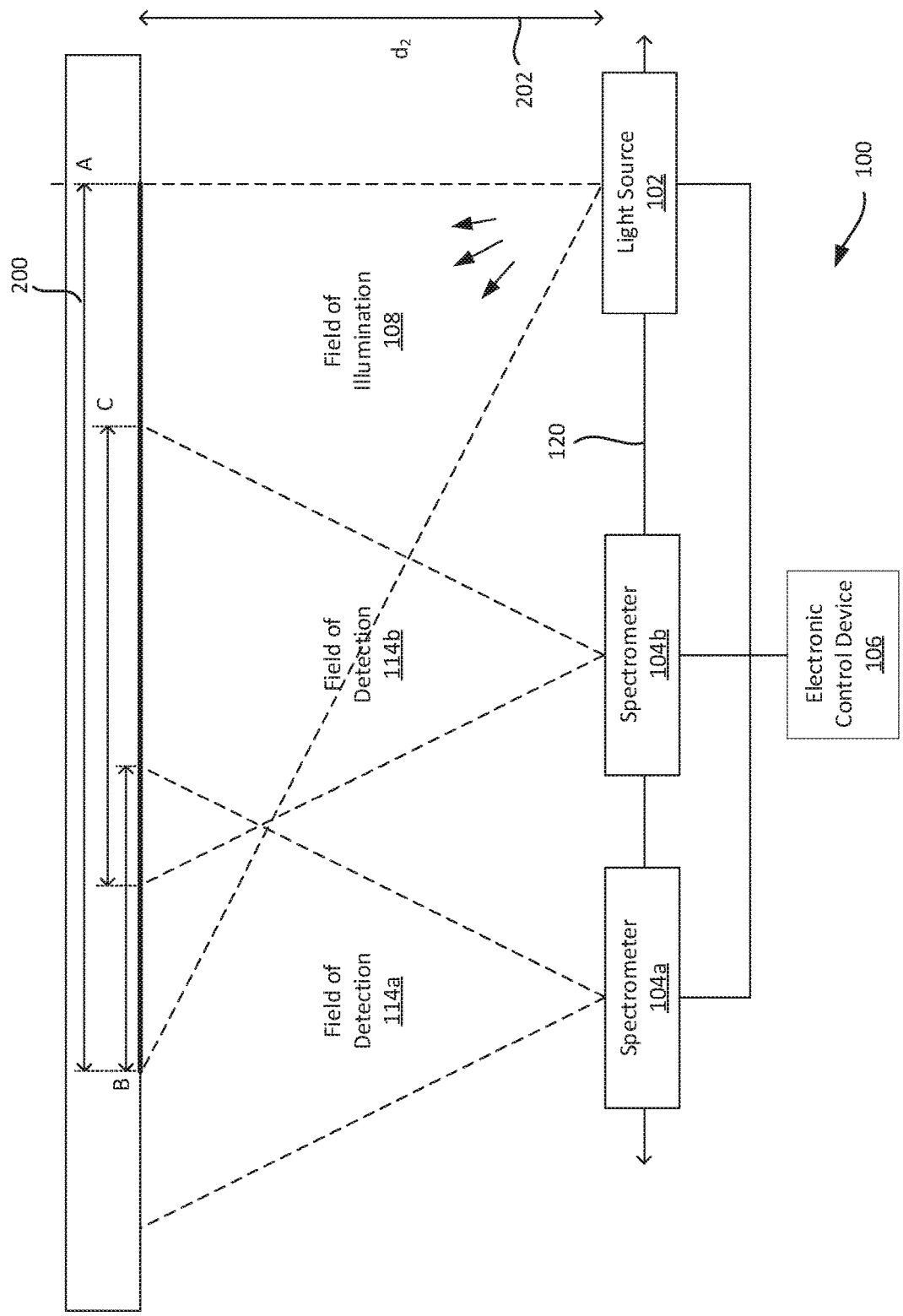
FIG. 2B is a schematic diagram of an example spectrometer system and a sample position a second distance from the spectrometer system.

To illustrate, in the example shown in FIG. 2B, the sample 200 is positioned at a second distance $d_2$ from the spectrometer system 100 (e.g., a distance greater than the first distance $d_1$). Due to the change in distance, the light emitted by the light source 102 illuminates a larger portion A of the sample 200 in the field of illumination 108 (e.g., compared to the portion A shown in FIG. 2A). Similarly, the first spectrometer 104a measures reflected light from a larger portion B of the sample 200 within the field of detection 114a (e.g., compared to the portion B shown in FIG. 2A). Thus, when the sample 200 is positioned at the second distance $d_2$, the first spectrometer 104a measures a different amount of light reflected by the sample 200 than that measured when the sample 200 is positioned at the first distance $d_1$. Similarly, the second spectrometer 104b measures reflected light from a larger portion C of the sample 200 within the field of detection 114b. Thus, when the sample 200 is positioned at the second distance $d_2$, the second spectrometer 104b also measures a different amount of light reflected by the sample 200 than that measured when the sample 200 is positioned at the first distance $d_1$.

The electronic control device 106 can estimate the distance between the sample 200 and the spectrometer system 100 based on the relationship between light detected by first spectrometer 104a and the light detected by the second spectrometer 104b. In some cases, the distance can be proportional or substantially proportional of the ratio between the intensity of light detected by the first spectrometer 104a and the intensity of light detected by the second spectrometer 104b, in a range of detected wavelengths common to the detection range both the first spectrometer 104a and the second spectrometer 104b. As an example, this can be expressed as:

$$d \propto I_1/I_2,$$

where d is the distance between the sample 200 and the spectrometer system 100, 1 is the intensity of light detected by the first spectrometer 104a according to the common detection range of wavelengths (e.g., the intensity of light reflected from the illuminated portion B, in the range of wavelengths $\lambda_3$ to $\lambda_4$), and $I_2$ is the intensity of light detected by the second spectrometer 104b according to the common detection range of wavelengths (e.g., the intensity of light reflected from the illuminated portion C, in the range of wavelengths $\lambda_3$ to $\lambda_4$).

To illustrate, as shown in FIGS. 2A and 2B, the ratio between the dimensions of portion B and the dimensions of portion C (e.g., the ratio between the surface area of portion A and the surface area of portion B) increases when the distance is increased from $d_1$ to $d_2$. Accordingly, the ratio between $I_1$ and $I_2$ will also increase when the distance is increased from $d_1$ to $d_2$. This increase in the ratio between $I_1$ and $I_2$ is proportional or substantially proportional to the increase in distance $d_2$ and $d_1$.

In some cases, the electronic control device 106 can estimate the distance between the sample 200 and the spectrometer system 100 by calculating the ratio $I_1/I_2$, and determining an estimated distance value proportional of the ratio (e.g., by multiplying the ratio by a scalar value). In some cases, the scalar value can be determined empirically or experimentally (e.g., by calculating the ratio $I_1/I_2$ for a number of different samples and distances, and determining a scalar value that approximates the proportional relationship between the ratio and the distance between the sample 200 and the spectrometer system 100). This scalar value can be subsequently used to estimate the distance in future measurements by the spectrometer system 100.

As described herein, the spectrometer system 100 also can associate the estimated distance with the measured spectral distribution of the reflected light. This technique enables light spectrum measurements to be compared to other light spectrum measurements (e.g., light spectrum measurements obtained at the same or different distances) in a more meaningful way. Further, this technique enables light spectrum measurements to be interpreted relative to one another in a more consistent manner. In some cases, the electronic control device 106 can generate a data record that includes the light spectrum measurements obtained by the first spectrometer 104a and/or the second spectrometer 104b, as well as the estimated distance between the sample 200 and the spectrometer system 100 at the time that the light spectrum measurements were made. The data record can be stored by the electronic control device 106 and/or transmitted to other systems (e.g., other spectrometer systems) for future reference or for additional processing.

In some cases, the first spectrometer 104a and the second spectrometer 104b can obtain light measurements concurrently. This technique can be beneficial, for example, as it enables the electronic control device 106 to calculate the ratio $I_1/I_2$ according to a consistent distance between the sample 200 and the spectrometer system 100, and using this information, estimate the distance in a more accurate and/or precise manner.

In some cases, the first spectrometer 104a and the second spectrometer 104b can conduct light measurements can scanning through a range of wavelengths in a sequential manner. As an example, the first spectrometer 104a can measure light according to the range of wavelengths $\lambda_2$ to $\lambda_4$ by initially measuring light according to the wavelength $\lambda_2$, and incrementally measuring light according to higher and higher wavelengths until the wavelength $\lambda_4$. Concurrently, the second spectrometer 104b can measure light according to the range of wavelengths $\lambda_3$ to $\lambda_5$ by initially measuring light according to the wavelength $\lambda_3$, and incrementally measuring light according to higher and higher wavelengths until the wavelength $\lambda_5$. Upon completion of the measurements, the electronic control device 106 can estimate the distance between the sample 200 and the spectrometer system 100 based on the measurements.

In some cases, measurements by the first spectrometer 104a and/or the second spectrometer 104b can be calibrated based on a reflectivity of the sample 200. As an example, the reflectivity of the sample 200 can be estimated by determining a power of light detected by the spectrometers 104a and/or 104b according to a common range of wavelengths (e.g., wavelengths $\lambda_4$ to $\lambda_5$). As another example, the reflectivity of the sample 200 can be determined using another technique (e.g., using an instrument other than a spectrometer). The measurements can be calibrated based on the reflectivity. In some cases, the measurements can be calibrated by scaling the measurements based on the reflectivity. In some cases, the measurements can be adjusting the measurement based on a look up table describing the relationship between a "raw" measurement (e.g., an un-calibrated measurement), the reflectivity, and a corresponding a calibrated measurement. This technique can be beneficial in improving the accuracy and/or precision of the spectrometer system. For example, if the reflectivity of the sample 200 is known for the common range of wavelengths, the system response for this common range of wavelengths can be accounted for without performing a separate white balance calibration process. Accordingly, the measurements of the spectrometer system 100 can be calibrated in situ, at least for the common rage of wavelengths.

In some cases, measurements obtained by one or more spectrometer systems can be shared with one or more other spectrometer systems to facilitate analysis of samples. For example, a spectrometer system can measure both the spectral distribution of light reflected from a sample and the distance between the sample and the spectrometer system at the time of the measurement, and transmit the measurements to a remote server system. Further, the spectrometer system can transmit additional information regarding the sample (e.g., known or estimated shapes, profiles, surface characteristics, and/or compositions of the sample). Other spectrometer system can retrieve the measurements and the additional information regarding the sample, and determine the characteristics of a sample based on the retrieved information. This is beneficial, for example, as it enables a spectrometer system to leverage measurements and other collection information from one or more other spectrometer systems to make more accurate determinations regarding a sample.

Figure 3:
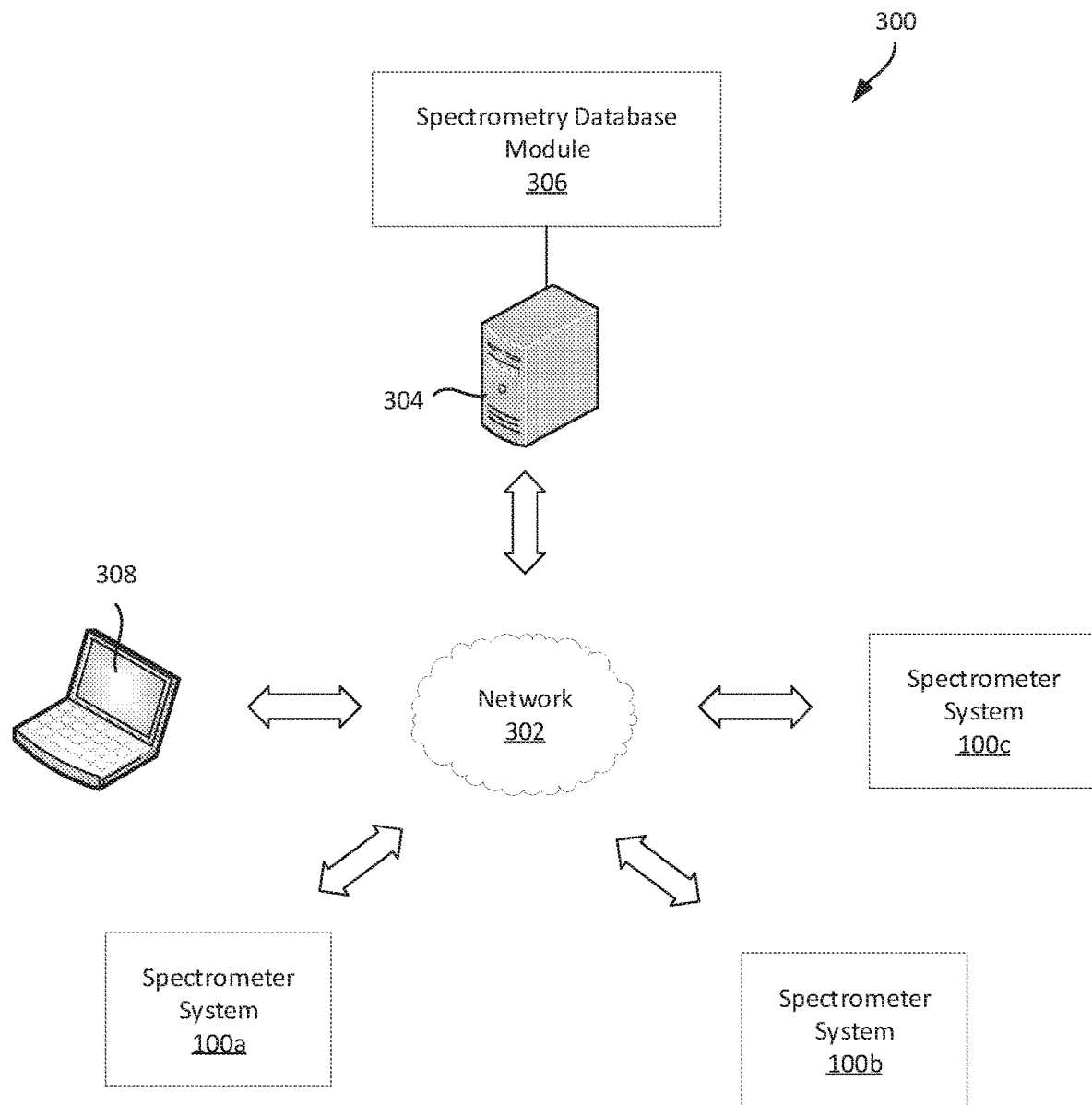
FIG. 3 is a schematic diagram of an example system for obtaining and analyzing spectrometer measurements

As an example, FIG. 3 shows an example system 300 for obtaining and analyzing spectrometer measurements. The system 300 includes several spectrometer systems 100a, a server system 304, and a client system 308 communicatively coupled via a communications network 302.

The network 302 can be any communications network through which data can be transferred and shared. For example, the network 302 can be a local area network (LAN) or a wide-area network (WAN), such as the Internet. The network 302 can be implemented using various networking interfaces, for instance wireless networking interfaces (such as WiFi, Bluetooth, or infrared) or wired networking interfaces (such as Ethernet or serial connection). The network 302 also can include combinations of more than one network, and can be implemented using one or more networking interfaces.

The client system 308 can be any electronic device that is used by a user to view, process, transmit and receive data. Examples of a client system 308 include computers (such as desktop computers, notebook computers, server systems, etc.), mobile computing devices (such as cellular phones, smartphones, tablets, personal data assistants, notebook computers with networking capability), and other computing devices capable of transmitting and receiving data from network 106. The client system 308 can include devices that operate using one or more operating system (for example, Microsoft Windows, Apple macOS, Linux, Unix, Android, iOS, etc.) and/or architectures (for example, x86, PowerPC, ARM, etc.) Although a single client system 308 is shown in FIG. 3, it is understood that there can be any number of client systems 308 in the system 300. Further, in some implementations, one or more client systems need not be located locally with respect to the rest of system 300, and one or more client systems can be located in one or more remote physical locations.

The server system 304 is illustrated as a single component, but can be implemented on one or more computing devices. The server system 304 can be, for instance, a single computing device that is connected to the network 302, and the spectrometry database module 306 can be maintained and operated on the single computing device. In some implementations, the server system 304 include multiple computing devices that are connected to network 302, and spectrometry database module 306 can be maintained and operated on some or all of the computing devices. For instance, the server system 304 can include several computing devices, and spectrometry database module 306 can be distributive on one or more of these computing devices (e.g., according to a "cloud" configuration). In some implementations, the server system 304 need not be located locally to the rest of system 300, and portions of the server system 304 can be located in one or more remote physical locations.

Each of the spectrometer systems 100a-c can be similar to the spectrometer system 100 shown and described with respect to FIGS. 1, 2A, and 2B. For example, each of the spectrometer systems 100a-c can be configured to measure both the spectral distribution of light reflected from a sample, and the distance between the sample and the spectrometer system at the time of the measurement (e.g., based on an asymmetrical arrangement of components, fields or illumination, and fields of detection).

Further, each spectrometer system 100a-c can be generate one or more data records indicating its measurements. For example, each spectrometer system 100a-c can generate data records that include the light spectrum measurements obtained by the spectrometer system 100a-c (e.g., measurements of light reflected from illuminated samples), as well as the estimated distances between the samples and the spectrometer systems 100a-c at the time that the light spectrum measurements were made.

Further, the data records can be populated with additional information regarding the samples. For example, the data records can include known or estimated shapes of the samples, profiles of the samples, surface characteristics of the samples, and/or compositions of the samples.

In some cases, the data records can include a description, classification, and/or the identity of the sample. For example, if the sample is a food item, the data record can include an identity of the food item (e.g., a particular type of food, a specific brand of food, etc.). Further, the data record can include information regarding the food item, such as its ingredients, and/or nutritional contents (e.g., caloric content, sugar content, vitamin and mineral content, fat content, protein content, carbohydrate content, sodium content, etc.). Further, the data record can include allergy information (e.g., indications that the food item should not be eaten by people with particular allergies).

As another example, if the sample is a medication, the data record can include an identity of the mediation (e.g., a particular type of medication, a specific brand of medication, etc.). Further, the data record can include information regarding the medication item, such as its active and inactive ingredients, recommended dose size, recommended intake instructions, etc. Further, the data record can include allergy or drug interaction information (e.g., indications that the medication should not be taken by people who are also taking certain other medications). Further, the data record can include an indication whether the medication is authentic (e.g., produced by an authorized source) or counterfeit (e.g., produced by an unauthorized source).

As another example, if the sample is a beverage, the data record can include an identity of the beverage (e.g., a particular type of beverage, a specific brand of beverage, etc.). Further, the data record can include information regarding the beverage, such as its ingredients, nutritional contents (e.g., caloric content, sugar content, vitamin and mineral content, fat content, protein content, carbohydrate content, sodium content, etc.), and/or alcoholic content. Further, the data record can include allergy information (e.g., indications that the beverage should not be eaten by people with particular allergies).

As another example, if the sample is a beverage, the data record can include an identity of the beverage (e.g., a particular type of beverage, a specific brand of beverage, etc.). Further, the data record can include information regarding the beverage, such as its ingredients, nutritional contents (e.g., caloric content, sugar content, vitamin and mineral content, fat content, protein content, carbohydrate content, sodium content, etc.), and/or alcoholic content. Further, the data record can include allergy information (e.g., indications that the beverage should not be eaten by people with particular allergies).

In some cases, the data records can include information determined exclusively by a respective spectrometer system 100a-c. In some case, the data records can include information regarding the samples that was determined in other ways (e.g., information regarding the samples determined through other analysis techniques, reference materials, data sheets, independent observation, manually inputted information, etc.). In some cases, data record can be generated and/or modified by one or more of the spectrometer systems 100a-c, the client system 308, and/or the server system 304 (e.g., to add additional information, remove information, and/or modify information in the data record).

The data records can be stored by the spectrometer systems 100a-c locally (e.g., by the electronic control device 106) and/or transmitted to other systems (e.g., one or more of the other spectrometer systems 100a-c, the server system 304, and/or the client system 308). For example, the spectrometer systems 100a-c can transmit one or more data records to the server system 304. The server system 304 can store the data records in a spectrometry database module 306 (e.g., a database module having one or more storage devices), and make the data records available for retrieval by one or more of the one or more of the other spectrometer systems 100a-c and/or the client system 308. As another example, the spectrometer systems 100a-c can transmit one or more data records to the client system 308 (e.g., an end user system). In turn, the client system 308 can present information from the data records to a user, compare information from two or more data records, and/or otherwise process the information from the data records. As another example, the spectrometer system 100a-c can directly transmit one or more data records to other spectrometer systems 100a-c. In turn, the spectrometer system 100a-c can present information from the data records to a user, compare information from two or more data records, and/or otherwise process the information from the data records.

In some cases, shared data records can be used to determine the properties of a sample according to a higher degree of accuracy and precision. For example, a spectrometer system can measure both the spectral distribution of light reflected from a sample and the distance between the sample and the spectrometer system at the time of the measurement. Based on one or more data records (e.g., data records generated by the spectrometer system or other spectrometer systems), the spectrometer system can identify another measurement that was made having a similar spectral distribution and/or a similar distance. If the measurements are sufficiently similar (e.g., within a threshold level of similarity), the spectrometer system can determine that the sample is likely to be similar or the same as the sample in the reference data record. Further, based on this similarity, the spectrometer system can determine that the sample likely has other properties that are similar or the same as the sample in the reference data record. This information can be presented to the user (e.g., visually using a display screen and/or aurally using an audio speaker).

As an example, spectrometer system can measure a spectral distribution of light $S_1$ reflected from a sample, and a distance $D_1$ between the sample and the spectrometer system at the time of the measurement. Further, the spectrometer system can retrieve several data records, including:

A first data record including measurements of a spectral distribution of light $S_1$ reflected from a first reference sample, a distance $D_2$ between the first reference sample and the spectrometer system at the time of the measurement, and an indication that the first reference sample has a composition of $C_1$ (e.g., determined through independent analysis), A second data record including measurements of a spectral distribution of light $S_1$ reflected from a first reference sample, a distance $D_1$ between the second reference sample and the spectrometer system at the time of the measurement, and an indication that the second reference sample has a composition of $C_2$ (e.g., determined through independent analysis), and A third data record including measurements of a spectral distribution of light $S_2$ reflected from a first reference sample, a distance $D_3$ between the third reference sample and the spectrometer system at the time of the measurement, and an indication that the third reference sample has a composition of $C_3$ (e.g., determined through independent analysis), As the measured spectral distribution of light $S_1$ and the distance $D_1$ are similar to that of second data record, the spectrometer system can determine that the sample is likely similar to the second reference sample. Further, the spectrometer system can determine that the sample is likely to have a similar composition as the second reference sample (e.g., a composition $C_2$), based on the additional information included in the second data record.

As another example, the spectrometer system can determine that the measured spectral distribution of light and distance are similar to those of a data record corresponding to a food item. Based on the similarity, the spectrometer system can determine that the sample is likely to be that food item. Further, based on the data record, the spectrometer system can determine additional information regarding the sample, such as its ingredients, nutritional contents, allergy information, and/or other relevant information and/or other relevant information regarding the food item.

As another example, the spectrometer system can determine that the measured spectral distribution of light and distance are similar to those of a data record corresponding to a medication. Based on the similarity, the spectrometer system can determine that the sample is likely to be that food item. Further, based on the data record, the spectrometer system can determine additional information regarding the sample, such as its active and inactive ingredients, recommended dose size, recommended intake instructions, allergy or drug interaction information, whether the drug is authentic or counterfeit, and/or other relevant information regarding the medication.

As another example, the spectrometer system can determine that the measured spectral distribution of light and distance are similar to those of a data record corresponding to a beverage. Based on the similarity, the spectrometer system can determine that the sample is likely to be that beverage. Further, based on the data record, the spectrometer system can determine additional information regarding the sample, such as its ingredients, nutritional contents, alcoholic content, allergy information, and/or other relevant information regarding the medication.

In some cases, the data records can include information determined exclusively by a respective spectrometer system 100a-c. In some case, the data records can include information regarding the samples that was determined in other ways (e.g., information regarding the samples determined through other analysis techniques, reference materials, data sheets, independent observation, manually inputted information, etc.). Further, although example information is described above, these are merely illustrative examples. In practice, a data record can include other information regarding a sample, either instead of or in addition to the information described herein.

In some cases, one or more of the spectrometer systems 100a-c, the server system 403, and/or the client system 308 can compare spectrometer measurement and/or data records in the manner described above.

Example Processes

Figure 4:
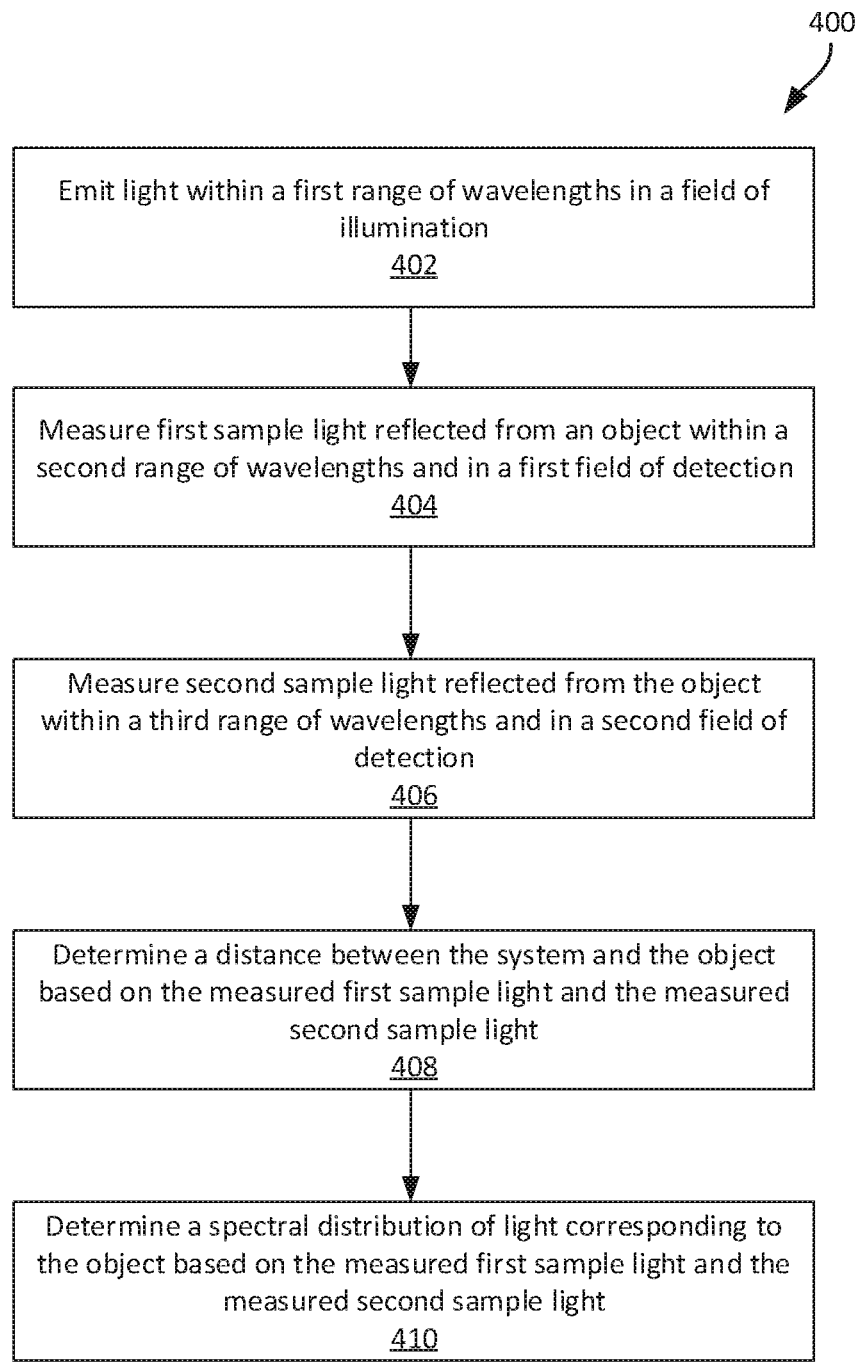
FIG. 4 is a flowchart diagram of an example process for obtaining measurements using a spectrometer system.

An example process 400 for using a spectrometer system is shown in FIG. 4. The process 400 can be performed to measure a spectral distribution of light reflected from a sample, and a distance between the sample and the spectrometer system at the time of the measurement. In some cases, the process 400 can be performed by one or more of the spectrometer systems or other systems shown in FIGS. 1-3.

In the process 400, light is emitted within a first range of wavelengths in a field of illumination (step 402). The light can be emitted, for example, using a light source of a spectrometer system (e.g., the light source 102 shown and described with respect to FIGS. 1, 2A, and 2B). The first range of wavelengths extend from $\lambda_1$ to $\lambda_4$, where $\lambda_1 < \lambda_4$.

First sample light reflected from an object is measured within a second range of wavelengths and in a first field of detection (step 404). The first sample light can be measured, for example, using a spectrometer (e.g., the first or second spectrometer 104a or 104b shown and described with respect to FIGS. 1, 2A, and 2B). The second range of wavelengths can be a subset of the first range of wavelengths.

Second sample light reflected from the object is measured within a third range of wavelengths and in a second field of detection (step 406). The second sample light can be measured, for example, using another spectrometer (e.g., another of the first or second spectrometer 104a or 104b shown and described with respect to FIGS. 1, 2A, and 2B). The third range of wavelengths can be a subset of the first range of wavelengths. Further, the third range of wavelengths can at least partially overlap the second range of wavelengths. For example, the second range of wavelengths can extend from $\lambda_1$ to $\lambda_3$, and the third range of wavelengths can extend from $\lambda_2$ to $\lambda_4$, where $\lambda_1 < \lambda_2 < \lambda_3 < \lambda_4$.

In some cases, the first sample light and the second sample light can be measured concurrently. In some cases, the first sample light can be measured incrementally with respect to the second range of wavelengths, and the second sample light can be measured incrementally with respect to the third range of wavelengths. Further, the first field of detection can at least partially overlaps the first field or detection and/or the second field of detection.

A distance between the system and the object is determined based on the measured first sample light and the measured second sample light (step 408). The distance can be determined, for example, using an electronic control device (e.g., the electronic control device 106 shown and described with respect to FIGS. 1, 2A, and 2B). The distance can be determined, at least in part, by determining a first intensity value indicating an intensity of the first sample light with respect to a fourth range of wavelengths, the fourth range of wavelengths being common to the second range of wavelengths and the third range of wavelengths. Further, a second intensity value indicating an intensity of the second sample light with respect to the fourth range of wavelengths can be determined. As an example, the fourth range of wavelengths can extend from $\lambda_2$ to $\lambda_3$.

A spectral distribution of light corresponding to the object is determined based on the measured first sample light and the measured second sample light (step 410). The spectral distribution of light can be determined, for example, using an electronic control device (e.g., the electronic control device 106 shown and described with respect to FIGS. 1, 2A, and 2B).

In some cases, a data record indicating the spectral distribution of light and the distance can be generated by the electronic control device. Further, the data record can be transmitted to a remote computer system (e.g., the server system 304 shown and described with respect to FIG. 3).

In some cases, one or more additional data records can be retrieved from the remote computer system, one or more additional data record. Each additional data record can indicate a respective sample spectral distribution of light and a respective sample distance associated with that sample spectral distribution of light. Further, a determination can be made regarding at least one of a similarity between the distance and one or more sample distances, or a similarity between the spectral distribution of light and one or more sample spectral distributions of light.

Further, one or more characteristics of the object (e.g., a shape, profile, surface characteristics, a composition of the object, an identity of the object, etc.) can be determined based on at least one of the similarity between the distance and one or more sample distances, or the similarity between the spectral distribution of light and one or more sample spectral distributions of light.

In some cases, a reflectivity of the object can be determined, and the spectral distribution of light corresponding to the object can be determined based further on the reflectivity of the object. The reflectivity of the object can be determined based on at least one of a power of the first sample light or a power of the second sample light. Further, the spectral distribution of light can be determined, at least in part, by calibrating at least one of the first spectrometer or the second spectrometer based on the reflectivity of the object.

Although various steps of the process 400 are described as being performed by an electronic control device, this need not be the case. For example, one or more of the steps can be performed by other devices (e.g., one or more client systems and/or server systems, such as those show and described with respect to FIG. 3).

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the spectrometer system 100 (e.g., the electronic control device 106) can be implemented using digital electronic circuitry, or in computer software, firmware, or hardware, or in combinations of one or more of them. In another example, the system 300 shown in FIG. 3 can be implemented using digital electronic circuitry, or in computer software, firmware, or hardware, or in combinations of one or more of them. In another example, the processes shown in FIG. 4 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 5:
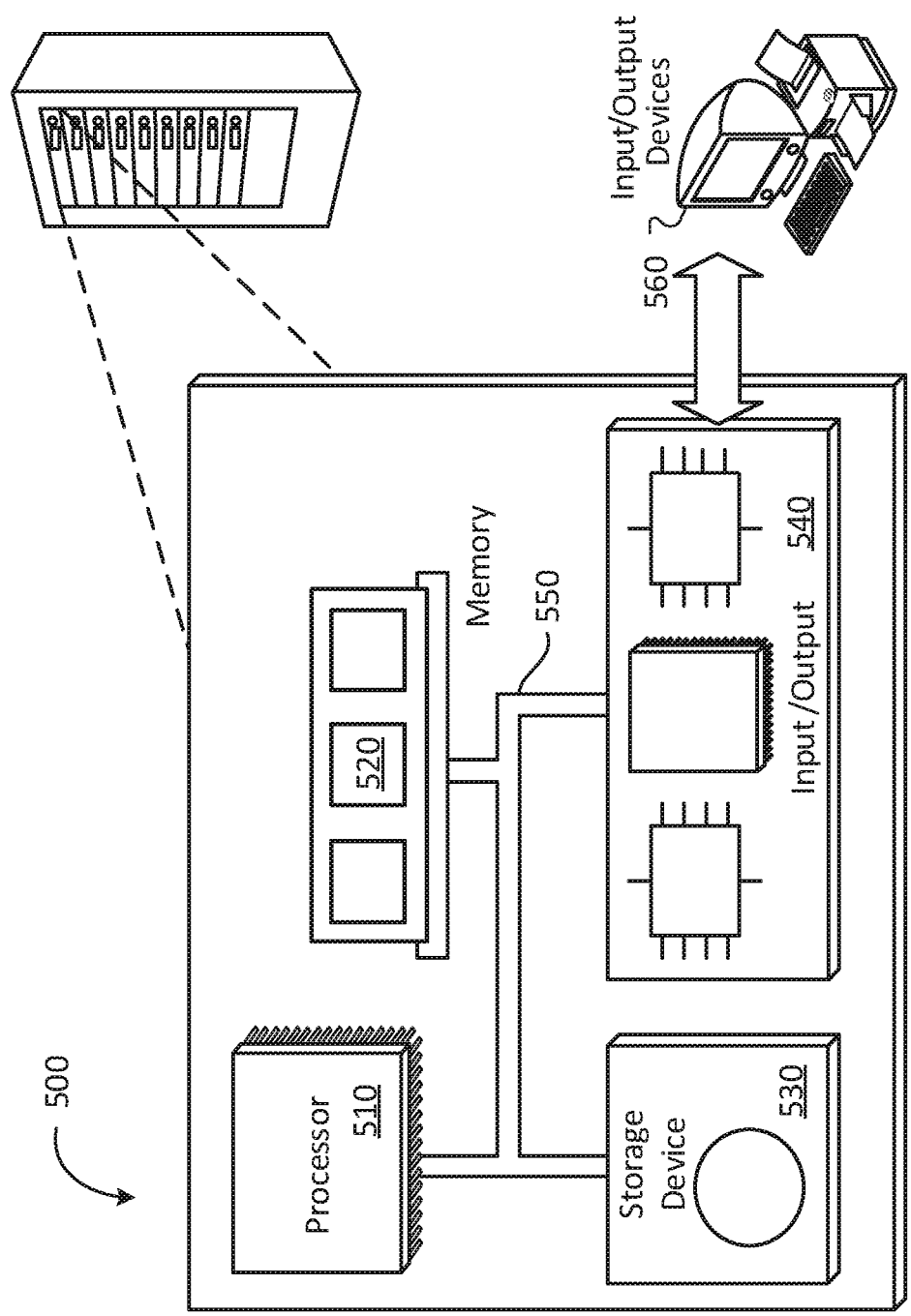
FIG. 5 is a schematic diagram of an example computer system.

FIG. 5 shows an example computer system 500 that includes a processor 510, a memory 520, a storage device 530 and an input/output device 540. Each of the components 510, 520, 530 and 540 can be interconnected, for example, by a system bus 550. In some implementations, the computer system 500 can be used to control the operation of a spectrometer. For example, the electronic control device 106 shown in FIGS. 1, 2A, and/or 2B can include a computer system 500 to control the operation of one or more components of a spectrometer and/or process measurement data. As another example, For example, the server system 304 and/or the client system 308 shown in FIG. 3 can include a computer system 500 to control the transmission and/or receipt of data across a network, the storage and processing of data, etc. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other implementations are within the scope of the claims.

The invention claimed is:

1. A system comprising:
 a light source operable to emit light within a first range of wavelengths in a field of illumination;
 a first spectrometer operable to measure first sample light reflected from an object within a second range of wavelengths and in a first field of detection, the second range of wavelengths being a subset of the first range of wavelengths;

a second spectrometer operable to measure second sample light reflected from the object within a third range of wavelengths and in a second field of detection, the third range of wavelengths being a subset of the first range of wavelengths, the third range of wavelengths at least partially overlapping the second range of wavelengths, and the second field of detection being different from the first field of detection; and an electronic control module operable to:
determine, based on the measured first sample light and the measured second sample light, a distance between the system and the object, and
determine, based on the measured first sample light and the measured second sample light, a spectral distribution of light corresponding to the object.

2. The system of claim 1, wherein the first spectrometer is operable to measure the first sample light concurrently with the second spectrometer measuring the second sample light.

3. The system of claim 1, wherein the first spectrometer is operable to measure the first sample light incrementally with respect to the second range of wavelengths, and
wherein the second spectrometer is operable to measure the second sample light incrementally with respect to the third range of wavelengths.

4. The system of claim 1, wherein the second spectrometer is disposed between the first spectrometer and the light source along an axis of the system.

5. The system of claim 1, wherein the first field of detection partially overlaps the second field of detection.

6. The system of claim 1, wherein the field of illumination at least partially overlaps the first field of detection and the second field of detection.

7. The system of claim 1, wherein the electronic control module operable to determine the distance by:
determining a first intensity value indicating an intensity of the first sample light with respect to a fourth range of wavelengths, the fourth range of wavelengths being common to the second range of wavelengths and the third range of wavelengths; and
determining a second intensity value indicating an intensity of the second sample light with respect to the fourth range of wavelengths.

8. The system of claim 1, wherein the electronic control module is operable to:
generate a data record indicating the spectral distribution of light and the distance.

9. The system of claim 1, wherein the electronic control module is operable to:
transmit the data record to a remote computer system.

10. The system of claim 9, wherein the electronic control module is operable to:
retrieve, from the remote computer system, one or more additional data records, each additional data record indicating a respective sample spectral distribution of light and a respective sample distance associated with that sample spectral distribution of light; and
determine at least one of:
a similarity between the distance and one or more sample distances, or
a similarity between the spectral distribution of light and one or more sample spectral distributions of light.

11. The system of claim 10, wherein the electronic control module is operable determine a composition of the object based on at least one of:
the similarity between the distance and one or more sample distances, or
the similarity between the spectral distribution of light and one or more sample spectral distributions of light.

12. The system of claim 1, wherein the electronic control module is operable to determine a reflectivity of the object, and
determine the spectral distribution of light corresponding to the object based further on the reflectivity of the object.

13. The system of claim 12, wherein the reflectivity of the object is determined based on at least one of a power of the first sample light or a power of the second sample light.

14. The system of claim 12, wherein determining the spectral distribution of light comprises calibrating at least one of the first spectrometer or the second spectrometer based on the reflectivity of the object.

15. The system of claim 1, wherein the system is a mobile device.

16. A method comprising:
emitting, using a light source of a system, light within a first range of wavelengths in a field of illumination;
measuring, using a first spectrometer of the system, first sample light reflected from an object within a second range of wavelengths and in a first field of detection, the second range of wavelengths being a subset of the first range of wavelengths;
measuring, using a second spectrometer of the system, second sample light reflected from the object within a third range of wavelengths and in a second field of detection, the third range of wavelengths being a subset of the first range of wavelengths, the third range of wavelengths at least partially overlapping the second range of wavelengths, and the second field of detection being different from the first field of detection;
determining, using an electronic control module, a distance between the system and the object based on the measured first sample light and the measured second sample light; and
determining, using the electronic control module, a spectral distribution of light corresponding to the object based on the measured first sample light and the measured second sample light.

17. The method of claim 16, wherein the first sample light and the second sample light are measured concurrently.

18. The method of claim 16, wherein the first sample light is measured incrementally with respect to the second range of wavelengths, and
wherein the second sample light is measured incrementally with respect to the third range of wavelengths.

19. The method of claim 16, wherein the first field of detection partially overlaps the second field of detection.

20. The method of claim 16, wherein the field of illumination at least partially overlaps the first field of detection and the second field of detection.

* * * * *